United States Patent [19]

Raj et al.

[11] 4,357,021
[45] Nov. 2, 1982

[54] FERROFLUID ROTARY-SHAFT SEAL APPARATUS AND METHOD

[75] Inventors: Kuldip Raj, Merrimack, N.H.; Alan Schwartzman, Cambridge, Mass.

[73] Assignee: Ferrofluidics Corporation, Nashua, N.H.

[21] Appl. No.: 208,287

[22] Filed: Nov. 19, 1980

[51] Int. Cl.³ .............................................. F16J 15/40
[52] U.S. Cl. ........................................ 277/1; 277/80; 277/135
[58] Field of Search ............... 277/1, 80, 135, DIG. 7; 308/10, 36.1, 187.1, 187.2

[56] References Cited

U.S. PATENT DOCUMENTS

| | | | |
|---|---|---|---|
| 2,557,140 | 6/1951 | Razdowitz | 277/80 |
| 3,746,407 | 7/1973 | Stiles et al. | 277/80 X |
| 3,848,879 | 11/1974 | Hudgins | 277/80 |
| 4,171,818 | 10/1979 | Moskowitz et al. | 277/80 |
| 4,304,411 | 12/1981 | Wilcock et al. | 277/13 X |

FOREIGN PATENT DOCUMENTS 55-107163 8/1980 Japan ...................................... 277/80
742657 6/1980 U.S.S.R. ................................ 277/80

OTHER PUBLICATIONS

*Machine Design*, issue of Mar. 28, 1968, "Magnetic-Fluid Seals", Rosenzweig et al., pp. 145–149.

*Primary Examiner*—Robert S. Ward, Jr.
*Attorney, Agent, or Firm*—Richard P. Crowley

[57] ABSTRACT

A ferrofluid rotary-shaft seal apparatus of extended seal life particularly adapted for use as an exclusion seal with a computer-disc-drive spindle, which seal apparatus comprises: an annular permanent magnet; first and second pole pieces of unequal width, one end of each pole piece extending into a close, noncontacting relationship with the surface of the shaft, to form a gap width between the one end of the pole piece and the surface of the shaft, the pole piece of greater width characterized by a tapered one end; and ferrofluid in the gap widths to form a ferrofluid O-ring seal, whereby, in operation, the ferrofluid, under the thinner pole piece, evaporates and forms an air gap, while the ferrofluid at the wider, tapered gap width provides extended seal life.

20 Claims, 2 Drawing Figures

FERROFLUID ROTARY-SHAFT SEAL APPARATUS AND METHOD

BACKGROUND OF THE INVENTION

Ferrofluid-type seal apparatuses for use in sealing rotary shafts, with single-and multiple-stage, ferrofluid-liquid, O-ring seals about the shaft, are well known (see, for example, U.S. Pat. No. 3,620,584 which describes a multiple-stage, ferrofluid, rotary-shaft seal).

Single- and multiple-stage ferrofluid seals have been used as exclusion seals, to protect one environment on one side of the shaft from contaminants in an environment on the other side of the shaft. Ferrofluid-type exclusion seals are useful particularly with computer-disc-drive spindles, to prevent contaminants in an environment from reaching a memory-disc area.

One standard ferrofluid exclusion seal presently employed in the computer field comprises an annular, ring-like, permanent magnet adapted to surround the spindle shaft and sandwiched between two, identical, pole-piece elements which are placed at the outer diameter into a contacting, magnetic-flux relationship with the one and the other polar ends of the permanent magnet. The inner diameter of the pole-piece elements extends into a close, noncontacting relationship with the surface of the shaft or spindle, to form a small gap for example, 2 to 10 mils, between the inner diameter of the pole piece elements and the shaft surface. A ferrofluid is disposed and magnetically retained in the gaps on the insertion of the magnetically permeable shaft or spindle, to form one or more liquid O-ring stages, which serve to form a ferrofluid exclusion seal about the shaft.

A wide variety of magnetic materials may be used to provide the permanent magnet, but usually the material is a sintered or bonded ceramic material having a longitudinal thickness of about 80 to 150 mils. The pole-piece elements are composed of magnetically permeable material, such as magnetic stainless steel (for example, 400 series), and range in thickness from about 25 to 80 mils. The standard exclusion seal, depending on customer requirements, is provided as described or placed in a nonmagnetic housing, such as of aluminum or stainless steel (for example, 300 series), such as by bonding- or staking-assembly techniques.

The exclusion seal is formed by placing a precise, optimum amount of a ferrofluid in the annular gap regions between the inner diameter of the pole pieces and the spindle shaft. Typically, the ferrofluid comprises a low-vapor-pressure carrier liquid, such as a fluorocarbon, a polyphenylether, a hydrocarbon, a diester liquid and similar low-vapor-pressure liquids, to provide for a very low mass loss of the ferrofluid forming the O-ring seal, thereby providing an exclusion seal of long operating life. For example, the standard ferrofluid exclusion seal is expected generally to last for several years under moderate temperature conditions and with the currently used computer-disc-drive-spindle speeds of 3600 rpm and with shaft diameters up to about 1.8 inches. The ferrofluid used may vary in viscosity, and the saturation magnetization, which usually ranges from 20 to 500 cps, and 100 to 400 gauss respectively.

It is desirable to extend the useful operating life of ferrofluid exclusion seals, particularly under higher ambient-temperature conditions; for example, greater than 50° C., at spindle speeds that exceed 3600 rpm, and for larger shaft diameters, or a combination of these conditions.

SUMMARY OF THE INVENTION

The invention relates to a ferrofluid-type, rotary-shaft seal having an extended life and to the method of manufacturing and using such seal apparatus. In particular, the invention concerns a ferrofluid exclusion seal particularly useful with and in sealing computer-disc-drive spindles for extended time periods.

In a standard ferrofluid exclusion seal, it has been found that there are two basic design considerations— one magnetic, which determines the seal pressure, and the other heat-generation, which determines the seal life span.

Generally, the total pressure capacity of the current ferrofluid exclusion seals ranges from about 30 to 60 inches of water divided approximately equally between the two pole pieces. The pressure requirement for the usual disc-drive application is only 5 inches of water; thus, the seals have a large safety margin when it comes to pressure. In fact, even one ferrofluid O-ring seal is more than adequate to yield the required pressure capacity; however, in the present, standard design, there are two pole pieces, so that the magnetic-flux circuit will be complete.

It is known that a temperature gradient across the ferrofluid O-ring seal is produced, as a result of the heat generated by the viscous shearing of the ferrofluid between the rotating spindle shaft and the inner diameter of the stationary pole pieces. Some of this heat is conducted away through the pole pieces and the spindle shaft. Thus, the operating ferrofluid temperature depends on the heat-sink capabilities of the seal materials and structure, which, in turn, determines the ferrofluid evaporation rate and, therefore, the life of the seal. The operating fluid temperature is higher, when ferrofluid fills both gap regions, than when only one stage is activated with ferrofluid, and the other stage has an air gap under it. This results because each gap region filled with ferrofluid serves as an independent source of heat, thus raising the temperature of the seal structure to a higher value than if just one stage had been activated with ferrofluid.

Hence, unlike the seal pressure which doubles for both stages activated, as opposed to just one, seal life increases by having only one gap region filled with ferrofluid, and not both or a plurality of gap regions. Thus, an ideal situation would be one in which only one pole piece is activated with ferrofluid. A second pole piece, which would operate with an air gap, is used only to complete the magnetic circuit. The air gap aids in permitting the movement of air from the cavity between the pole pieces. The present seal-installation techniques, however, prohibit achieving this goal, since the ferrofluid is injected into the magnet area, which results in ferrofluid migration into both gap regions, upon the spindle shaft insertion.

It has been discovered that the seal life of a ferrofluid rotary-shaft seal apparatus may be extended by the use of one pole piece tapered at the one end thereof, to provide a defined radial-gap width that varies from a narrow gap to a wider gap across the cross-section of the radial gap. The formation of the narrow gap on one side of the tapered pole piece is also advantageous, in that the evaporation of the ferrofluid from that side of the pole piece is considerably reduced during operation, and the contamination into an environment on that side is reduced, such as where the magnetic disc is placed on this side of the ferrofluid exclusion seal on a computer-disc-drive spindle.

In the preferred embodiment, the exclusion seal apparatus comprises two pole pieces with unequal pole-piece widths, with the tapered pole piece having the greater width; for example, over about 50 mils; for example, 50 to 80 or more mils, while the other pole piece is of reduced thickness, with mechanical strength consideration a factor in how small a width can be used, but, for example, typically ranges from 25 to 40 mils; for example, 25 to 35 mils. The variation in pole width and its advantages are described more particularly in copending patent application Ser. No. 208,288 filed on the same day as this application and incorporated by reference herein.

The thinner pole piece is disposed, so that a radial gap is formed beneath the one end of the pole piece. The radial gap may range from 2 to 6 mils, as is typical, or greater; for example, up to 25 mils; for example, 12 to 24 mils, depending on design considerations. The variation in radial gap and its advantages, to form O-ring ferrofluid seals, are described in copending patent application Ser. No. 208,438 filed on the same day as this application and incorporated by reference herein. In the preferred embodiment, the radial gap formed under the thinner pole piece is higher than the radial gap under the tapered pole piece, in order to form preferentially a single-stage seal under the tapered pole piece and place less ferrofluid volume under the thinner pole piece, while still permitting the formation of a closed-circuit, magnetic-flux path, when the shaft is inserted into the seal apparatus. Typically, the gap under the other or thinner pole piece would be 10 to 25 mils, while the gap under the tapered pole piece would range at the one side, depending on the taper angle, from 4 to 8 mils; for example, 5 to 7 mils, and, at the other side, typically from 10 to 20 mils; for example, 12 to 15 mils.

In operation, a volume of ferrofluid, such as a diester or other ferrofluid, for example, having a viscosity of 50 to 500 cps and a saturation magnetization of 100 to 450 gauss, is injected into the magnet area of the seal, prior to installation; that is, the insertion of the shaft, and the ferrofluid retained at the ends of the pole pieces and therebetween. On insertion of the magnetically permeable shaft, such as a computer-disc-drive spindle, the magnetic-flux path is altered, and the ferrofluid then fills preferentially the gap under the thicker, tapered pole piece, due to the stronger magnetic-field gradient thereunder. The thinner pole piece, due to its reduced width and for larger radial gap, receives and retains only a small, if any, amount of the ferrofluid. Where some ferrofluid is retained, it is evaporated rapidly; that is, has a short seal life, and the exclusion seal becomes a single-stage seal or insufficient ferrofluid is provided, so that, on insertion of the shaft, a single-stage seal is formed, with the ferrofluid O-ring seal only under the thicker, tapered pole piece.

In the described embodiment, the wider, tapered pole-piece structure of the exclusion seal provides for a stronger magnetic-field gradient than that of a pole piece having a flat end, so that the seal-pressure capacity is more than one-half of the comparative, standard, flat, two-pole-piece exclusion seal. In addition, ferrofluid loss, under the tapered pole piece, into the magnetic-disc-memory area, is minimized, since the other surface area is reduced.

Of course, the small radial gap on one side of the tapered pole piece may be placed toward the inside or outside of the permanent magnet ring as desired, particularly where evaporation contamination is not a factor in seal operation.

The invention will be described for the purpose of illustration only in connection with a particularly preferred embodiment; however, it is recognized that those persons skilled in the art may make various changes and modifications to the described embodiment, without departing from the spirit and scope of the invention.

DESCRIPTION OF THE EMBODIMENTS

Figure 1:
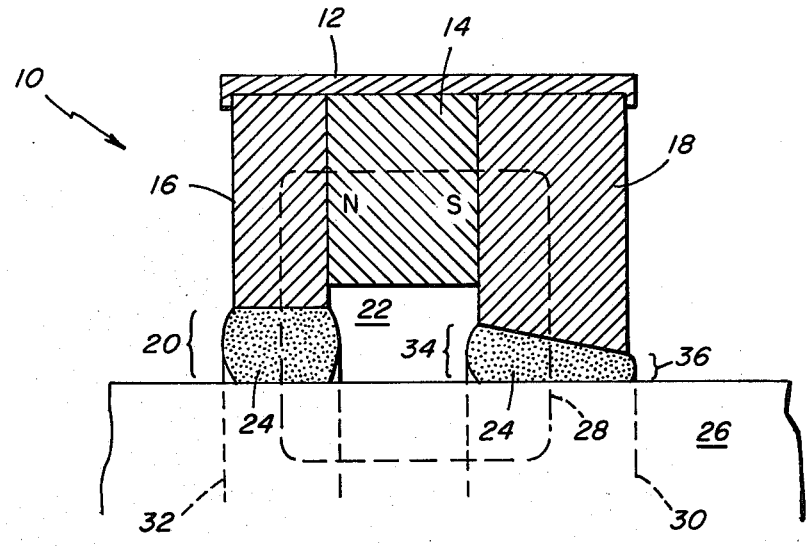
FIG. 1 is a schematic, illustrative, cross-sectional view of a ferrofluid exclusion seal of the invention at the start of operation.

FIG. 1 shows an extended-life, exclusion seal apparatus 10 which comprises a permanent magnet ring 14 having opposite poles on either side, the magnet 14 within a nonmagnetic housing 12, such as of stainless steel or aluminum, and having magnetically permeable pole pieces 16 and 18 in sandwich contact with either side of the magnet 14, to form a cavity 22 therebetween. The magnet 14 and the pole pieces 16 and 18 in housing 12 are disposed about a magnetically permeable shaft 26, such as a computer-disc-drive spindle.

Pole piece 18 is wider than pole piece 16; for example, 25 mils to 80 mils, and is tapered at the one end, which extends into a close, noncontacting relationship with the surface of shaft 26, to form a radial gap therebetween, while one end of pole piece 16, which is flat, also forms a radial gap 20; for example, of 15 to 25 mils. The tapered radial gap varies from the larger gap 34; for example, 12 to 25 mils, to the smaller outside gap 36; for example, 4 to 6 mils. The smaller radial gap 36 is placed toward the environment to be protected and, as illustrated, is a memory-disc area from which contaminants are desired to be excluded. The radial gaps 20 and the gap between 34 and 36 contain ferrofluid 24, to form at least one, but, as illustrated, initially two, ferrofluid O-ring seals, the seals shown in parallel dotted lines 30 and 32 on the surface of the shaft 26. The magnetic-flux path is illustrated by dotted line 28. Where the volume of ferrofluid is reduced, the insertion of the shaft 26 would create immediately a single-stage, extended-life seal, with the ferrofluid substantially in gaps 34 to 36 to form seal 30.

Figure 2:
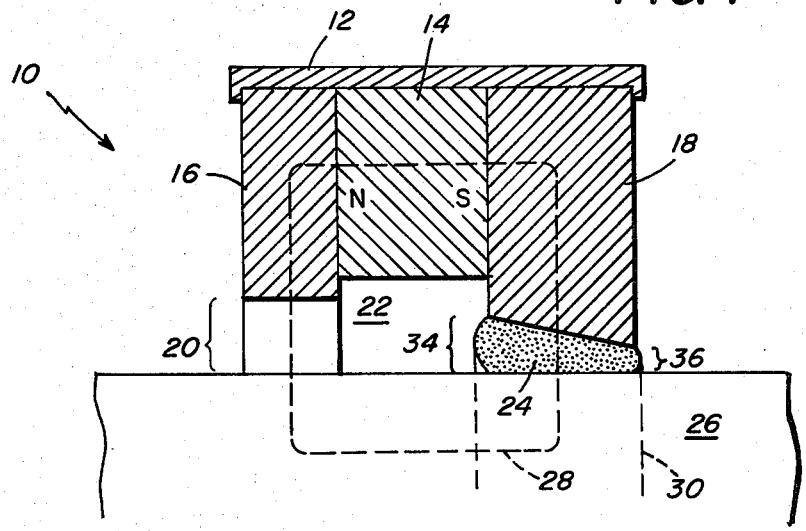
FIG. 2 is the exclusion seal of FIG. 1 after evaporation of the ferrofluid under one pole piece.

FIG. 2 shows the exclusion of the seal of FIG. 1, where the ferrofluid 24 has evaporated, to form a single-stage seal, after shaft operation, or the single-stage seal which is formed on insertion of the shaft 26, where the thinner pole piece 16 and the use of a high gap 20 and a low volume of ferrofluid permit most of the ferrofluid to form the single-stage seal immediately on shaft insertion. The exclusion seal described has an extended seal life over the standard exclusion seal, and also reduces ferrofluid-evaporated contaminants from the memory-disc area.

Experiments, comparing a standard, two-stage exclusion seal, with identical pole pieces 40 mils in width and with a 6-mil radial gap and a tapered pole-piece seal described, having a radial gap of 6 mils to 15 mils and a thickness of 60 mils, were conducted. The tests were conducted at 80° C. with a fluorocarbon-based ferrofluid, having a viscosity of 2000 cps and a magnetic saturation of 300 gauss at 27° C., employing about 120 μl of the ferrofluid. The standard seal showed failure after 20 hours, while the tapered exclusion seal showed total failure after 135 hours. Thus, the tapered exclusion seals of the invention provide a single-stage seal of extended seal life.

What is claimed is:

1. A ferrofluid, rotary-seal apparatus having an extended seal life, which seal apparatus comprises:
   (a) an annular permanent magnet adapted to surround the rotary shaft to be sealed and having poles of opposite polarity at each end; and
   (b) first and second, magnetically permeable, pole-piece elements in a magnetic-flux relationship with the one and the other ends, respectively, of the permanent magnet, each pole piece having a one end and another end and adapted to surround the rotary shaft to be sealed, the one end of each pole-piece element adapted to extend into a close, non-contacting relationship with the surface of the shaft to be sealed, to form a gap therebetween, the first pole piece having a flat end at the one end, and the second pole piece having a tapered end at the one end, the first and second pole pieces being unequal in width, with the second pole piece of greater width,
   whereby ferrofluid disposed and retained in the first and second gaps, to form magnetic O-ring seals about the shaft, will evaporate preferentially, during rotation of the shaft, from the first gap at the flat end, to provide a seal apparatus of extended seal life, having a first air gap and a second single-stage, ferrofluid-sealing gap at the tapered end of the second pole piece.

2. The seal apparatus of claim 1 wherein the width of the first pole piece ranges from about 25 to 45 mils.

3. The seal apparatus of claim 1 wherein the width of the second pole piece ranges from about 50 to 80 mils.

4. The seal apparatus of claim 1 wherein the one end of the second pole piece is tapered, to provide for a gap length from one to the other sides of the pole piece of from about 2 to 20 mils.

5. The seal apparatus of claim 1 wherein the second pole piece is positioned, to provide for a gap of less length on the outside of the pole pieces away from the permanent magnet.

6. In combination a seal apparatus of claim 1 and a rotary-shaft element, the seal apparatus having ferrofluid in the gap under the second pole piece to seal the rotary shaft.

7. The combination of claim 6 wherein the shaft element comprises a computer-disc-drive-spindle shaft.

8. The seal apparatus of claim 1 wherein the gap under the first pole piece is greater in length than the gap under the second pole piece.

9. The seal apparatus of claim 8 wherein the gap under the first pole piece ranges from about 10 to 25 mils.

10. In combination a seal apparatus of claim 8 and a rotary-shaft element, the seal apparatus having ferrofluid in the gap under the second pole piece to seal the rotary shaft.

11. A ferrofluid, rotary-seal apparatus having an extended seal life, which seal apparatus comprises:
   (a) an annular permanent magnet adapted to surround the rotary shaft to be sealed and having poles of opposite polarity at each end; and
   (b) first and second, magnetically permeable, pole-piece elements in a magnetic-flux relationship with the one and the other ends, respectively, of the permanent magnet, each pole piece having a one end and another end and adapted to surround the rotary shaft to be sealed, the one end of each pole-piece element adapted to extend into a close, non-contacting relationship with the surface of the shaft to be sealed, to form a gap therebetween, the first pole piece having a flat end at the one end, and the second pole piece having a tapered end at the one end, the first and second pole pieces being unequal in width, with the second pole piece of greater width, and the gap under the one end of the first pole piece being greater in length than the gap under the second pole piece,
   whereby ferrofluid will preferentially form a magnetic O-ring under the second pole piece about the shaft, to provide a seal apparatus of extended seal life, having a first air gap and a second ferrofluid single-stage sealing gap at the tapered end of the second pole piece.

12. In combination a seal apparatus of claim 11 and a rotary-shaft element, the seal apparatus having ferrofluid in the radial gap under the second pole piece to seal the rotary shaft.

13. The combination of claim 11 wherein the shaft element comprises a computer-disc-drive-spindle shaft.

14. In a method for extending the seal life of a ferrofluid, rotary-shaft seal apparatus, which, in sealing a rotary shaft, comprises:
   (a) surrounding the rotary shaft with an annular permanent magnet having one end and another end and having poles of opposite polarity at each end;
   (b) surrounding the rotary shaft with first and second, magnetically permeable, pole-piece elements in a magnetic-flux relationship with one and the other ends of the permanent magnet, each pole piece having a one end and another end;
   (c) extending the one end of each pole piece into a close, noncontacting relationship with the surface of the rotary shaft, to form first and second gaps therebetween of defined length; and
   (d) retaining magnetically, in the first and second gaps, a ferrofluid to form at least two liquid O-ring seals on the surface of the rotary shaft, to effect sealing of the rotary shaft, the improvement which comprises
   providing a second pole piece of greater width than the width of the first pole piece, with the second pole piece having a one tapered end, to define a radial gap which varies from a narrow to a wider gap across the cross-section of the gap under the second pole piece, whereby the ferrofluid will evaporate preferentially from the gap under the first pole piece, to form a single-stage ferrofluid seal of extended seal life, with ferrofluid in the gap of the second pole piece.

15. The method of claim 14 which includes tapering the one end of the second pole piece, to provide a gap length which varies from about 2 to 20 mils.

16. The method of claim 14 which includes disposing the tapered second pole piece, so that the shortest gap length is positioned on the outside and away from the magnet.

17. The method of claim 14 wherein the ferrofluid has a viscosity of from about 50 cps to 500 cps and a magnetic saturation of about 100 to 450 gauss.

18. The method of claim 14 which includes employing as the rotary shaft a computer-disc-drive-spindle shaft.

19. The method of claim 14 which includes positioning the one end of the first pole piece to have a gap thereunder greater in length than the gap under the one end of the second pole piece, whereby, on insertion of a magnetically permeable shaft element, ferrofluid will form preferentially in the gap under the one tapered end of the second pole piece.

20. The method of claim 14 which includes:
(a) inserting into the seal apparatus a magnetically permeable shaft element which comprises a computer-disc-drive shaft to a memory-disc area; and
(b) positioning the second pole piece, so that the smaller gap length under the one end of the second pole piece is placed toward the memory-disc area, thereby protecting the memory-disc area from contamination from the ferrofluid.

* * * * *